March 29, 1938. N. THEOFILOS 2,112,612

COFFEE MAKING APPARATUS

Filed April 23, 1936 3 Sheets-Sheet 1

Nicholas Theofilos
INVENTOR.

BY Clarence E. Threedy

HIS ATTORNEY.

March 29, 1938. N. THEOFILOS 2,112,612
COFFEE MAKING APPARATUS
Filed April 23, 1936 3 Sheets-Sheet 2
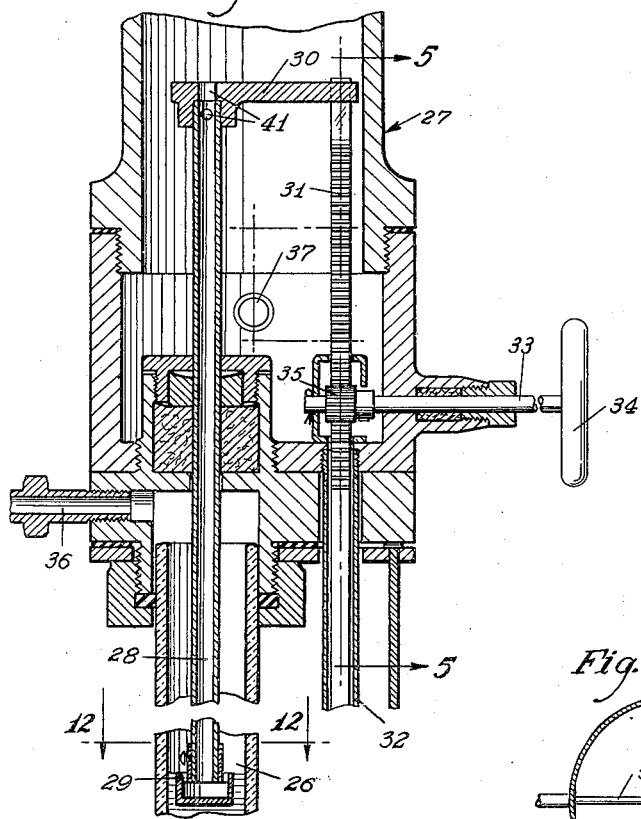
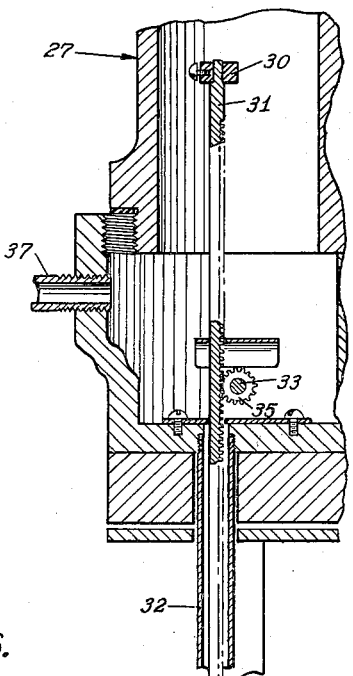
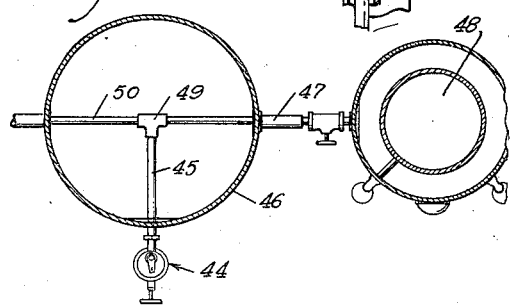
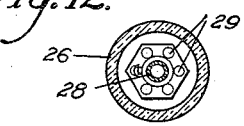
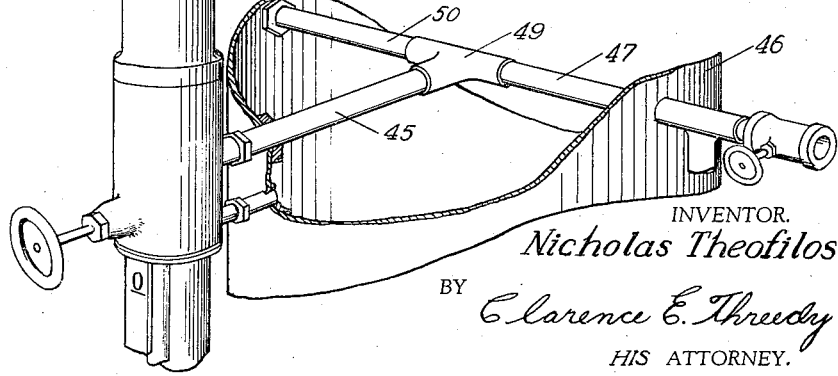
INVENTOR.
Nicholas Theofilos
BY Clarence E. Threedy
HIS ATTORNEY.

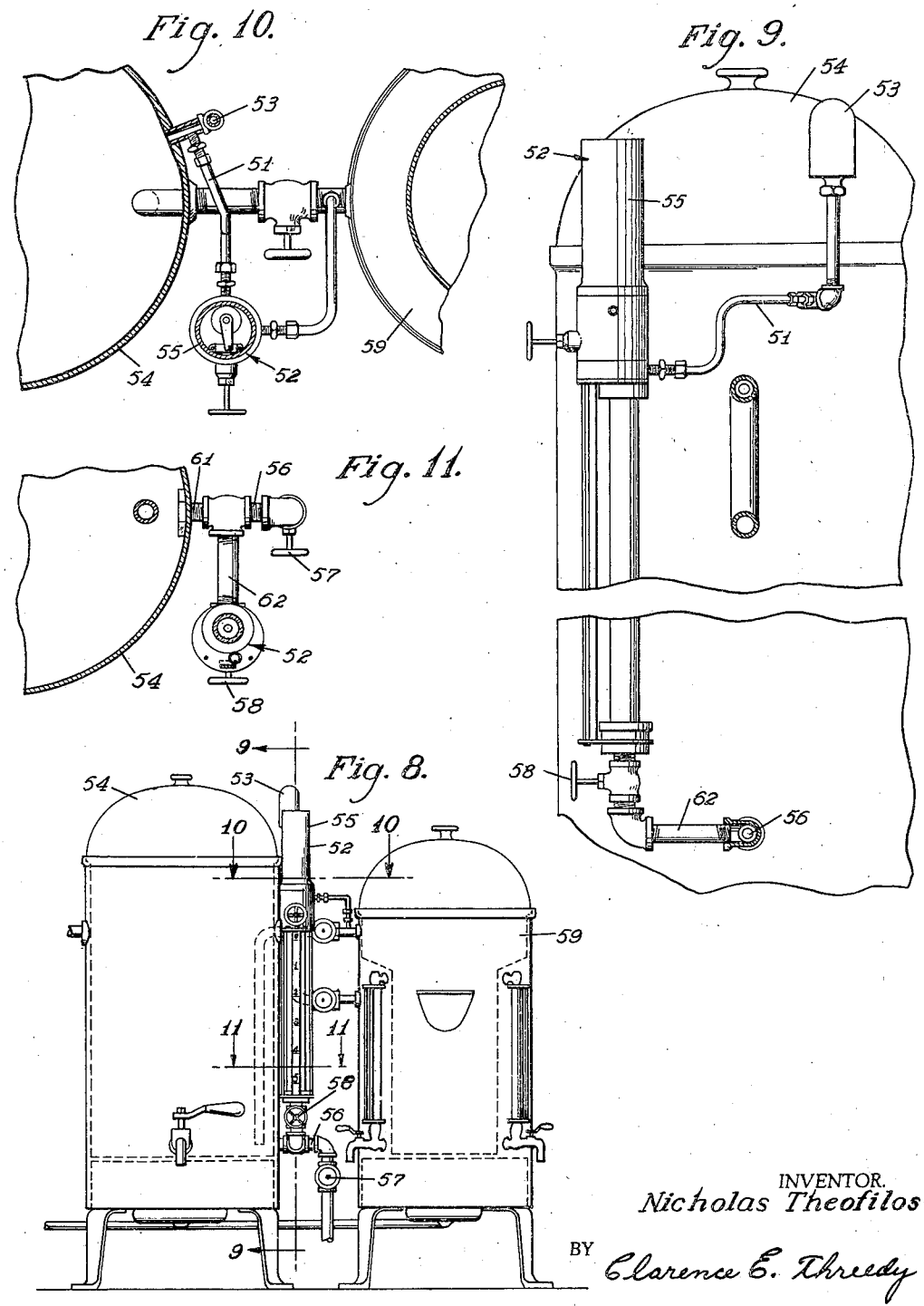

Patented Mar. 29, 1938

2,112,612

UNITED STATES PATENT OFFICE 2,112,612

COFFEE MAKING APPARATUS

Nicholas Theofilos, Chicago, Ill.

Application April 23, 1936, Serial No. 75,905

8 Claims. (Cl. 53—3)

This invention relates to coffee-making apparatus.

It is an object of this invention to provide an improved coffee-making apparatus which is relatively simple and inexpensive in construction and efficient in use.

Another object of the present invention is to provide a new and improved device for regulating or controlling and measuring the volume or quantity of hot water supplied to a coffee urn in a coffee-making device.

Another object of this invention is to provide a device for the purpose last mentioned, which in its preferred form of construction may be associated with the conventional and well known coffee making apparatus.

An additional object of the present invention is to provide a device which may be set to deliver a predetermined measured quantity of hot water from the water heater or boiler of a coffee-making device to the urn of the same, and which device will automatically stop the flow of hot water from the heater to the urn as soon as and when a predetermined measured quantity of hot water has been delivered from the heater to the urn.

Another object of the present invention is to provide a device which may be readily installed in coffee-making devices of conventional design which are already in use, and which may likewise be installed in and made a permanent part of new coffee-devices during the operation of manufacturing the same.

An additional object of the present invention is to provide a novel gauge for indicating both the water level in the heater 11 and the volume of hot water to be transferred from the water heater to the coffee urn.

Other objects will appear hereinafter.

The invention consists in the novel combination and arrangement of parts to be hereinafter described and claimed.

The invention will be best understood by reference to the accompanying drawings showing the preferred form of construction, and in width:

Fig. 4 is an enlarged vertical sectional view showing a preferred form of the new hot water control device;

Fig. 5 is a vertical sectional view on line 5—5 in Fig. 4;

Fig. 6 is a horizontal sectional view of a modified form of the present invention showing the same installed as a permanent installation in a coffee-making device;

Fig. 7 is a perspective view, partly in section, of the modified form of the invention shown in Fig. 6;

Fig. 8 is an elevational view of another modification of the invention;

Fig. 9 is a vertical sectional view on line 9—9 in Fig. 8;

Fig. 10 is a horizontal sectional view on line 10—10 in Fig. 8;

Fig. 11 is a transverse sectional view on line 11—11 in Fig. 8; and

Fig. 12 is a sectional detail view on line 12—12 in Fig. 4.

One form of the present invention is shown in Figs. 1 to 5, inclusive, of the drawings, and is therein generally indicated at 20, and is shown as an attachment to a coffee-making apparatus which is generally indicated at 10, and which comprises a water heater or boiler 11 having associated therewith a conventional burner 11'. The coffee making device further includes two coffee urns 12 and 13 arranged at the sides thereof (Fig. 1), and each having arranged therein a water jacket or receptacle 12' including an overflow or vent 13' for the usual and conventional purpose of maintaining the coffee fluid at the proper temperature.

In each of the coffee urns 12 and 13 is confined the usual supporting basket for the coffee grounds. The conventional urns 12 and 13 and heater or boiler 11 have communication together through means of conduits 15', each including a valve 16' normally closed, as are the valves 16 and 17 when the invention herein described is operably associated with a conventional coffee making apparatus substantially of a construction such as herein described.

Figure 1:
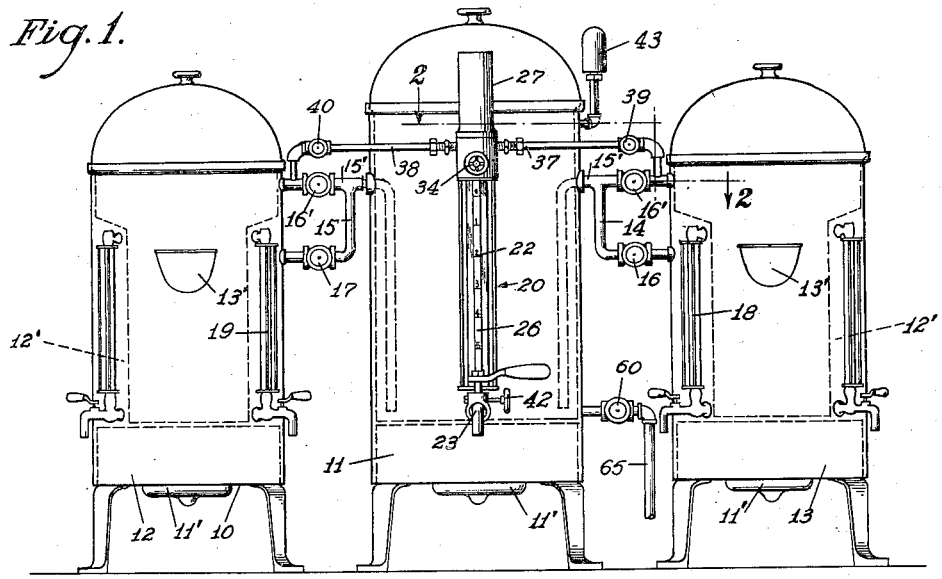
Fig. 1 is a front elevational view of one form of the present invention showing the same applied as an attachment to a coffee-making device of substantially conventional design.
Figure 2:
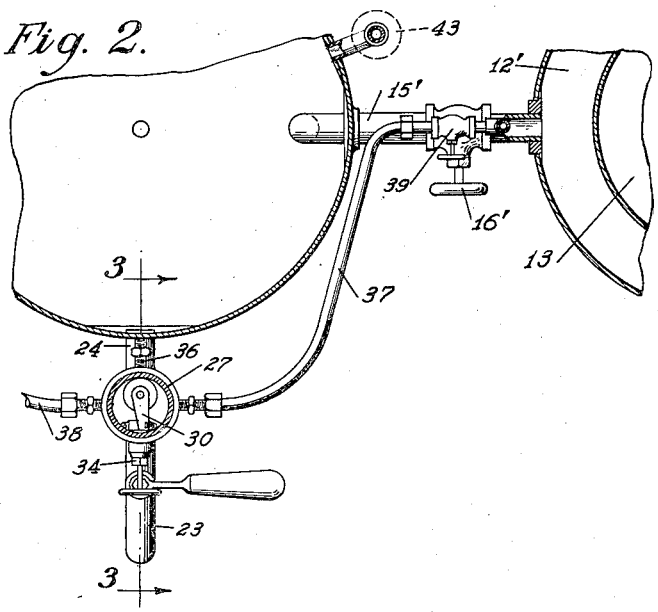
Fig. 2 is a horizontal sectional view on line 2—2 in Fig. 1.

As is well understood in the art, in the process of making coffee, in devices of the general type shown in Fig. 1, water is heated in the heater 11, and the hot water from the heater 11 is transmitted by way of the conduits 15' through valves 16' and into the urns 12 and 13; and by way of the pipes 14 and 15 leading from the conduit 15' into the water jackets 12', suitable hand-controlled valves 16 and 17 being arranged in the pipes 14 and 15, respectively, so as to control the flow of hot water therethrough, the water heater 11 being provided with a cold water intake 65, and as shown, the conduits 15' extend downwardly into the tank 11 to a point adjacent the bottom thereof.

In order to determine how much water has been run from the heater 11 into the urns 13 and 12, the latter are customarily provided with water gauges 18 and 19 (Fig. 1), and in the process of making coffee by means of a device of the character shown, it is customary for the person operating the same to open, for example, the valve 16' and then watch the gauge 18 to determine when the desired amount of hot water has been transferred from the water heater 11 to the urn 13, it being understood that the urns are filled one at a time, so that in filling the urn 12 the valve 16' leading thereto will be opened and the valve 16' leading to the urn 13 will be closed. There are a number of objections to the foregoing usual practice of making coffee, and one of the same is that the operator is required to watch the gauge 18 or 19 in order to be ready to close the supply valve when the desired amount of hot water has been transferred to the urns from the heater 11.

Another objection to the foregoing practice is that if the operator fails to watch the gauge 18 or 19, the hot water in the urn 12 or 13 will overflow the same, thereby causing loss and overflowing of the coffee fluid. Any superfluous flow of water into an urn containing a predetermined amount of coffee grounds causes the grounds to be irreparably spoiled as to flavor and necessitates a removal of the ingredients from the urn and the making of a new batch of coffee.

Accordingly, it is another object of the present invention to provide a device which will overcome the foregoing difficulties and objectionable features experienced in the use of the prior art devices for making coffee, and to provide a device by means of which the volume or quantity of hot water to be transferred from the heater to the urn may be automatically controlled, that is, the device may be set to deliver a predetermined quantity of hot water from the heater to the urn, and as soon as and when this predetermined quantity of hot water has been delivered from the heater to the urn, the flow of hot water from the heater to the urn will be automatically stopped.

In order to accomplish the foregoing and other objects of the present invention, the new hot water control device is provided, and the same is generally indicated at 20 (Fig. 1).

The new hot water control device 20 comprises a water gauge or vertically extending tube 26 which is mounted on the hot water heater or boiler 11, at the front of the same, and this gauge 26 is provided with suitable indicia 22 which may represent gallons or other liquid units or quantities. The hot water control unit 20 also includes a drain faucet 23 which has a neck 24, and this neck 24 is attached to the water heater 11 adjacent the bottom of the same (Fig. 3).

Figure 3:
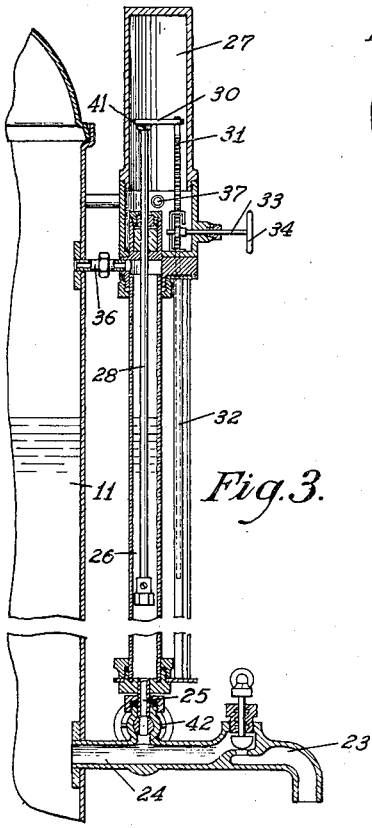
Fig. 3 is a vertical sectional view on line 3—3 in Fig. 2, showing the new hot water control device.

The neck 24 of this faucet 23 is connected, by way of a short pipe 25 having a hand-controlled valve 42 therein, with the vertically extending gauge or tube 26 which is mounted on the water heater 11 (Fig. 3). The upper end portion of the gauge 26 projects into a housing or casing 27, and slidably mounted in the gauge 26, for up and down or vertical movement therein, is a smaller tube 28 which is provided at its lower end with an inlet or apertured member 29 (Figs. 4 and 12).

Leading from the water heater 11 into the housing 27 is a tube 36 (Fig. 4) which provides an inlet from the heater 11, so as to equalize the pressure in the heater 11 and in the gauge 26. Leading out of the housing 27 are outlet pipes or conduits 37 and 38 for hot water, and these pipes 37 and 38 lead, respectively, into the urns 13 and 12 (Fig. 1), suitable hand-controlled valves 39 and 40 being arranged in the conduits 37 and 38.

Attached to the tube 28 adjacent the upper end thereof (Fig. 4) is a cross head or arm 30, and attached to this cross head or arm 30 is a rack of teeth 31, this rack 31 being slidably guided in a housing 32 which depends from and projects below the casing 27.

Meshing with the rack 31 is a pinion 35 which is mounted on a shaft 33, this shaft 33 being suitably journaled in the housing 27 and having a handle portion 34 which projects exteriorly of the housing 27 (Fig. 4).

Provided on the water heater 11 is a safety valve 43, and provided in the cold water intake 41 is a hand-controlled valve 60.

For the purpose of illustrating the operation of the form of the present invention which is illustrated in Figs. 1 to 5, inclusive, a typical example of the operation of the same will now be given:

Hot water is admitted from the heater or boiler 11 to the water jacket 12' through the pipe 15 by opening valve 17. When the required amount of water is thus admitted to this jacket 12', the valve is closed and the water maintained at an even temperature by the burner 11'.

Assuming, for the purpose of this example, that the operator of the device desires to transfer 2 gallons of hot water from the heater 11 into the urn 13. In this instance the valves 40 and 60 and the faucet 23 will be closed, and the valves 39 and 42 will be opened, whereupon the handle 34, shaft 33 and pinion 31 will be manipulated so as to adjust the rack 31 and tube 28 until the open or apertured lower end portion 29 of the tube 28 is disposed at a point in the gauge 26 where it is in horizontal alignment or registration with the indicium "2" on the gauge 26, and which mark "2" represents, for example, 2 gallons. Hot water will then flow from the heater 11 into the urn 13 as follows:

From the heater 11 through the conduit or neck 24 of the drain faucet 23, and through the short tube 25, thence into the gauge 26, then by way of the intake ports 29 into the tube 28, through the latter, and thence out of the same by way of the openings or ports 41 into the housing 27 (Fig. 4), and thence by way of the conduit 37 and valve 39 into the urn 13. Accordingly, when the desired amount of hot water, namely, in the present example, 2 gallons, has been transferred from the heater 11 to the urn 13, the water level in the heater 11, as indicated in the gauge 26, will have fallen to a point just below the inlet ports 29 to the tube 28, whereupon hot water will cease to flow from the heater 11 into the urn 13, and the valves 39 and 42 will then be closed. In this manner the flow of hot water from the heater 11 to the urn 13 is automatically shut off after a predetermined volume or quantity of the same has been transferred from the heater or boiler 11 to the urn 13.

It is to be noted in this connection that the gauge 26—22—28 indicates both the water level in the heater 11 and the volume of hot water to be transferred from the heater 11 to the urn 12 or to the urn 13.

The foregoing operation may be repeated for the urn 12 by opening the valves 40 and 42 and closing the valves 39 and 16', it being understood that only one of the urns 12 and 13 is filled at one time with hot water from the heater 11.

In the modified form of the invention shown in Figs. 6 and 7 of the present invention, the unit or attachment 20 is shown as a permanent fixture for, or installation in, a coffee making apparatus of the general type shown in Fig. 1, it being understood in this connection that in the form of the invention shown in Figs. 1 to 5, inclusive, the unit 20 is shown as an attachment for a coffee-making device of a conventional design, whereas in the modified form of the invention shown in Figs. 6 and 7, the unit 20 is shown as it appears when built in, and as a permanent part of, a coffee-making apparatus.

In the form of the invention shown in Figs. 6 and 7, the new unit, or hot water control device, is generally indicated at 44, and is substantially the same as the unit 20, except that in this form of the invention the hot water outlet or conduit 45 from the housing 46 (which corresponds to the housing 27 of the unit 20) is extended through the water heater or boiler 46 and is divided by a T 49; a conduit or branch pipe 47 leading to an urn 48, and a second conduit or branch pipe 50 leading from the T 49 to a second coffee urn (not shown), or, as is apparent, the unit 44 (as well as the unit 20) may be used in conjunction with a coffee-making device which includes only a single coffee urn as well as with a device which includes two coffee urns.

Another modification of the invention is shown in Figs. 8 to 11, inclusive, and this form of the invention is substantially similar to the form of the invention shown in Figs. 1 to 5 inclusive, except that in the form of the invention shown in Figs. 8 to 11, inclusive, the air equalizer tube 51 for the unit 52, (which unit 52 corresponds to the unit 20), leads from the safety valve 53, for the water heater 54, into the housing 55 of the unit 52, rather than leading directly from the water heater 54 into the housing 55, as does the air equalizer or pressure relief tube 21 which leads from the water heater 11 into the housing 27, in the form of the invention which is shown in Figs. 1 to 5, inclusive.

Another difference between the form of the invention shown in Figs. 8 to 11, inclusive, and the form of the invention shown in Figs. 1 to 5, inclusive, resides in the fact that in the former a portion 61 of the cold water intake 56 to the water heater 54 is also utilized as the hot water inlet from the heater 54 to the pipe 62 which leads into the unit 52, it being understood that the control valve 57 in the cold water intake 56 is closed when the hot water control valve 58 is open. Otherwise the form of the invention shown in Figs. 8 to 11, inclusive, is substantially the same as the form of the invention shown in Figs. 1 to 5, inclusive.

It is to be noted that in the modification shown in Figs. 8 to 11 inclusive, the same is shown as associated with a coffee-making device which includes a single coffee urn 59, although it is to be understood, of course, that the same may be used with a coffee-making device which includes two or more urns.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A liquid measuring device for transferring measured quantities of liquid under pressure from one container to another, said device comprising a transparent gauge tube open at opposite ends and means mounting the same in substantially vertical position adjacent a first one of said containers, said tube having communication at its lower end with a lower region of said first container, a closed chamber disposed at the upper end of said tube, an elongated measuring tube open at both ends and having a portion disposed within said transparent tube and an opposite open end disposed within said chamber, means embracing said measuring tube and sealing the upper end of said transparent tube from communication with said chamber, driven mechanism within said chamber for raising and lowering said measuring tube to position the lower end of the same at various levels in said transparent tube, manipulating means accessible exteriorly of said chamber for driving said driven means, together with duct means connecting said chamber with a second container and means for equalizing the pressure within said first container and said transparent tube.

2. Liquid measuring mechanism for transferring liquid under pressure from one container to another, said mechanism including an elongated duct member supported in upright position and having communication at its lower end with the lower region of a container containing liquid under pressure, said elongated duct having an enlarged and closed chamber at its upper end, together with an elongated measuring tube disposed for sliding movement within said elongated duct member, said tube having a lower end portion disposed in the duct member and an opposite upper open end portion disposed within said chamber, means embracing said measuring tube at the upper end of said duct member and operable to permit sliding movement of the tube and effectively seal the upper end of said elongated duct member from the chamber, mechanism in said chamber for reciprocating said measuring tube and including an operating member extending outside of the chamber, duct means connecting said chamber with a second container, together with means for equalizing the pressure in said first container and said elongated duct member.

3. An attachment for a coffee-making device of the type which includes a water boiler and a coffee urn, said attachment comprising means for conducting hot water from the boiler to the urn including a water gauge for indicating both the water level in the boiler and the volume or quantity of hot water to be transferred from the boiler to the urn, said gauge including a relatively stationary tubular member, and a second tubular member slidably mounted in the said first-named tubular member for movement in and relative thereto for measuring various quantities of water to be delivered to the urn.

4. An attachment for a coffee-making device of the type which includes a water boiler and a coffee urn, said attachment comprising means for conducting hot water from the boiler to the urn including a water gauge for indicating both the water level in the boiler and the volume or quantity of hot water to be transferred from the boiler to the urn, said gauge having a relatively stationary tubular member, a second tubular member slidably mounted in the said first-named tubular member for movement in and relative thereto, and manually operable means for adjusting the said second-named tubular member in and relative to the said first-named tubular member.

5. A measuring attachment for coffee making devices having a water boiler and a coffee urn, said attachment comprising a housing member having communication with a said urn, a transparent conduit communicating at one extremity with said housing and at its opposite extremity with a said boiler, a measuring conduit slidable within said transparent conduit and having one open extremity for contact with water in the latter and an opposite extremity opening into said housing, and means in said housing for adjustably sliding said measuring conduit within said transparent conduit, said means including a rack and pinion and a manual operating member therefor accessible from without the housing.

6. An attachment for coffee making devices having a water heater or boiler and a coffee urn, said attachment comprising a housing having communication with a said urn, a transparent conduit communicating at one extremity with said housing and at its opposite extremity with a said heater or boiler, a measuring tube supported within said housing for slidable movement into and out of said transparent conduit and having one extremity opening into said conduit and its opposite extremity opening into the interior of said housing, and mechanism for adjustably sliding said measuring conduit and including a driven member movably supported within the housing and operatively attached to said measuring conduit, together with a manually operable driving member for adjusting said driven member.

7. An attachment for coffee making devices having a water boiler and a coffee urn, said attachment comprising a closed housing having communication with a said urn, a transparent tubular member communicating at one extremity with a said boiler and being supportably engaged at its opposite extremity by said housing, a measuring tube slidably supported for movement by said housing into and out of said transparent member and communicating at its one extremity with the interior of the latter and at its opposite extremity with the interior of said housing, and mechanism for adjustably sliding said measuring tube into and out of said transparent member, said mechanism comprising a rack movably supported by said housing and having a portion extended within the latter and operatively connected to said measuring tube and also having a portion extending outside of the housing into a closed tubular member extended therefrom, and a manually adjustable driving member supported by said housing for adjustably reciprocating said rack and said measuring tube.

8. A measuring attachment for coffee brewing devices of the type having a hot water reservoir and a coffee urn, said attachment comprising a transparent gauge duct having two open ends and means supporting said member at one of said ends and providing communication from the latter to the lower region of said reservoir, said gauge duct member having an enlarged chamber at its other said end and communicating with the same, said chamber having communication with said coffee urn, together with measuring means in the form of an elongated sleeve-like member open at opposite ends and having one of said ends disposed in said gauge member for communication with liquid therein and having its opposite end disposed within said chamber whereby liquid may be passed from within said gauge member through said sleeve-like member into said chamber, an operating mechanism including a manipulating member accessible exteriorly of said chamber and having driving action with said sleeve-like member for moving the same back and forth within said gauge member.

NICHOLAS THEOFILOS.